United States Patent
Bernard et al.

[15] 3,691,614
[45] Sept. 19, 1972

[54] METHOD OF PRODUCING A SEALING-TIGHT JOINT BETWEEN TWO TUBES ON DIFFERENT MATERIALS

[72] Inventors: Jean Andre Bernard, Barga; Adamo Renato Faraoni, Ranco, both of Italy

[73] Assignee: European Atomic Energy Community (Euratom), Luxembourg

[22] Filed: Jan. 19, 1970

[21] Appl. No.: 4,147

[30] Foreign Application Priority Data

Jan. 24, 1969 Belgium..................P 1211

[52] U.S. Cl. ............29/470.5, 29/480, 29/516, 29/523, 285/173, 285/286
[51] Int. Cl. ..................................B23k 31/02
[58] Field of Search........285/173, 382, 382.1, 382.4, 285/382.5, 334.5, 286; 29/470.5, 473.7, 507, 523, 516, 480

[56] References Cited

UNITED STATES PATENTS

| | | |
|---|---|---|
| 448,717 | 3/1891 | Hogan ..............285/334.5 X |
| 1,573,103 | 2/1926 | Tomlinson..........285/382.2 X |
| 2,984,899 | 5/1961 | Richter et al..........285/286 X |
| 3,434,194 | 3/1969 | Whittaker et al............29/523 |
| 3,520,561 | 7/1970 | Rininger...............285/286 X |
| 3,534,988 | 10/1970 | Lindsey ..................29/507 X |
| 1,703,037 | 2/1929 | Heck ......................29/516 X |
| 2,545,527 | 3/1951 | Maxwell..............29/523 UX |
| 3,100,742 | 8/1963 | McGeary et al............29/480 |
| 3,112,564 | 12/1963 | Murray...................29/470.5 |

FOREIGN PATENTS OR APPLICATIONS 811,060 8/1951 Germany..................285/187

*Primary Examiner*—Charlie T. Moon
*Attorney*—Stevens, Davis, Miller & Mosher

[57] ABSTRACT

A method of producing a sealing tight joint between two tubes one of which has a greater wall thickness than the other. The thinner tube has a collar formed on it which will engage a circumferential groove in the end of the thicker tube when placed in end-to-end relationship. A ring shaped to conform with the collar is placed inside it. A sleeve is slid over the two tubes, this sleeve having an inwardly extending flange which engages the ring and holds it and the collar against the end of the thicker tube. After welding the collar in place, the thicker tube is worked so as to expand it axially so that the grooved end tightly engages the collar.

4 Claims, 1 Drawing Figure

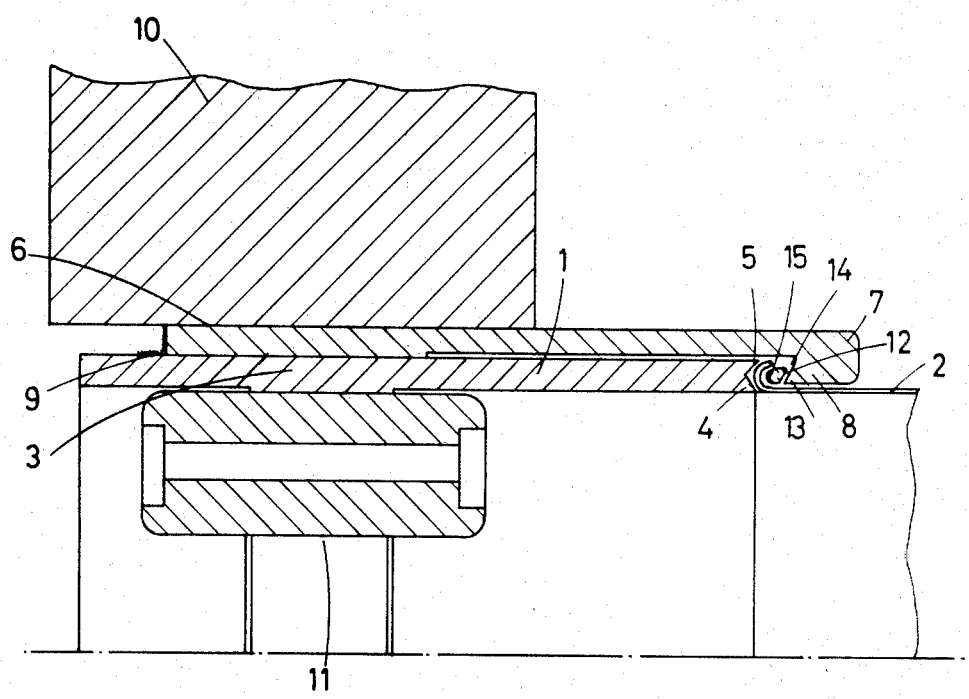

METHOD OF PRODUCING A SEALING-TIGHT JOINT BETWEEN TWO TUBES ON DIFFERENT MATERIALS

This invention relates to a method of making a joint between two tubes of different materials and to joints made by this method.

In the specification of our co-pending application Ser. No. 719,066 filed Apr. 5, 1968, now U.S. Pat. No. 3,591,918 there is described and claimed a method of making an end-to-end joint between two tubes in which one tube (herein called the thick tube) has at least at its end portion to be joined a wall thickness greater than that of the other tube (herein called the thin tube). In that method the end face of the thick tube is formed with at least one circumferential groove or rib, the thin tube is formed with an external or internal flange or collar around its end to be joined to abut the end face of the thick tube, a sleeve is fitted outside or inside an end portion of the thick tube, and the sleeve extends over the adjacent end portion of the thin tube. The sleeve has a circumferential step which supports the flange or collar on the side remote from the thick tube and has a corresponding shape to clamp the flange or collar in the groove or grooves or over the rib or ribs. The sleeve is welded to the thick tube at a location spaced from the end of that tube and the thickness of the wall of the thick tube is mechanically reduced in a zone between the weld and the end of the tube thereby to effect differential endwise expansion of the thick tube and sleeve and to clamp the flange or collar between the step and the end face of the thick tube. This method (which will be referred to hereinafter as a method hereinbefore defined of making an end-to-end joint between two tubes) enables a joint forming a tight seal to be made between two tubes of different materials, one of the tubes having a thin wall. The joint may for example be used in a primary circuit of a nuclear reactor where tightness against leakage under pressure and thermal changes are important.

In the particular construction described in the specification of the aforementioned application, the thin tube has a collar, which may for example be C-shaped in section in a radial plane but may be of other shapes. The end of the thick tube has a groove compatible with the shape of the collar. The surface of the flange on the sleeve which bears against the collar was shaped to be compatible with the shape of the collar. This arrangement had the disadvantage that this flange on the sleeve required machining to a complex shape. Even so, when the flange collar and groove are in contact under high pressure, the surfaces in contact are still relatively small in area. It is an object of the present invention to provide an improved method of making a joint of the kind hereinbefore defined.

In accordance with the present invention, in the method hereinbefore defined of making a joint between two tubes, the surface of the flange on the sleeve which faces said collar is made frustoconical and an intermediate ring is placed between this flange and the collar, the ring having its face towards the flange formed as a frustoconical surface corresponding to that on the flange and having on the opposite face a surface adapted to fit the collar.

The intermediate ring is preferably made from a material having a coefficient of thermal expansion substantially the same as that of the tube formed with a groove and that of the sleeve. Preferably also it has at least equivalent mechanical properties, in particular compressive strength.

The following is a description of one embodiment of the invention reference being made to the accompanying drawing which shows a section taken along an axial plane through the tubes to be connected.

Referring to the drawing, there is shown a first tube 1 (the thick tube) and a second tube 2 (the thin tube) made of a material different from that of the thick tube 1. The two tubes 1, 2 are to be connected to one another with a sealing-tight joint. The tube 1 is formed, adjacent the joint, with a thickened portion 3 and the end face of the tube 1 is formed with a groove 4. The end of the tube 2 is formed by any known method with a flange or collar 5. In the drawing the collar is C-shaped but it can have any other shape for example it may be Z-shaped or U-shaped. However the shape of the collar and the groove have to be compatible with one another so that the collar can be forced tightly into the groove.

A sleeve 6 made of a material having a coefficient of thermal expansion substantially the same as that of the tube 1 and having a flange 7, has an internal diameter such that the sleeve 6 can be fitted over the tube 1 with a sliding fit. The flange 7 has a frustoconical face 8 on the surface facing the collar 5. This conical face forms an angle of 45° to 60° with the inside cylindrical surface of the sleeve 6. Between this conical face and the collar 5 there is inserted a ring 12, preferably made of a material having a coefficient of thermal expansion close to that of the tube 1 and sleeve 6. This ring 12 has mechanical properties, particularly strength in compression, at least equivalent to that of the tube 1 and sleeve 6 but preferably higher. The ring 12 bears on flange 7 by way of a frustoconical face 14 similar to that of the face 13 on the flange. Its opposite face has a surface shaped similar to that of the collar 5.

To produce the sealing-tight joint, the sleeve 6 is introduced so that its face 13 comes into free abutment with the ring 12 and the opposite face of the ring 12 is close to or abutting the collar 5. There may be a clearance of the order of 0.1 mm. The tube 1 and sleeve 6 are then welded as shown at 9 without prestress in either. The assembly is then mounted in a support 10 and the thickened portion 3 is expanded by a tube expander roller, indicated at 11, thus producing an axial elongation of the portion 3 relative to sleeve 6 which pressurizes the different members. The material of the thickened portion 3 is so elongated that the tube end and groove 4 move towards the right as shown in the drawing and compress the collar between the end groove 4 and the ring 12 which is itself compressed against the surface 13 of the flange. The collar 5 is thus firmly retained in place between the groove and the ring thus achieving a satisfactory sealing tightness. The sleeve 6 is preferably of considerable axial length, so that the collar can be tightened in a satisfactory controllable manner, and a reserve of resilient deformation can be stored which is made available without the joint being thermo-mechanically stressed. The pre-stressing produced by the mechanical expansion may be such that sealing pressure is unloaded only when the temperature of the whole internal member drops by a value of the order of 50° C relative to the sleeve. This therefore ensures that the joint behaves very satisfactorily when subjected to thermal shocks. Using the present invention, compared with the method described in the aforementioned U.S. Pat. No. 3,591,918, there are particular advantages. Instead of the flange 7 on the sleeve 5 having to be machined to make it fit collar 5, there is only need for a simple turning operation to produce a frustoconical surface. It is much easier to provide the face on the ring 12 with a surface adapted to fit that of the collar 5 than it is to machine the sleeve. Thus there are considerable advantages from the manufacturing point of view. Also due to compression resulting from elongation of the inner tube 1 (following expansion of the thickened portion 3) radial deformation of the ring 12 has the effect of further improving the seal. It has been found that joints produced by the method described above have given sealing tightness of up to $10^{-7}$ Lussecs, corresponding to the limit of sensitivity of a leak detector of the mass spectrometer type.

We claim:

1. A method of making an end-to-end joint between a first tube having a thin wall and a second tube having at least at its end portion to be joined a wall thickness greater than that of the first tube, comprising:
   a. forming the first tube with a collar around the end to be joined to abut the end face of the second tube;
   b. placing a ring over said collar, said ring having one face adapted to fit the surface of the collar and the other face with a frusto-conical surface;
   c. fitting a sleeve on an end portion of the second tube, which sleeve extends over the adjacent end portion of the first tube and has a circumferential step with a frusto-conical surface which engages the frusto-conical surface of the ring on the side remote from the second tube;
   d. welding the sleeve to the second tube at a location longitudinally spaced from the end of that tube;
   e. working the metal between the weld and the end of the tube thereby to reduce mechanically the thickness of the walls of the second tube to effect differential endwise expansion of the second tube and sleeve and to clamp the collar between the ring and the end face of the second tube.

2. A method as claimed in claim 1 wherein the ring is made from a material having a coefficient of expansion substantially the same as that of the second tube and that of the sleeve.

3. A method as claimed in claim 1 wherein the ring is formed of a material having at least equivalent mechanical properties, in resisting compression, to the second tube and to the sleeve.

4. A method as claimed in claim 1 wherein the frustoconical surface of the flange on the sleeve forms an angle between 60° and 45° with the inside surface of the sleeve.

* * * * *